W. BRUCKNER.
FURNACE FOR DESULFURIZING ORES.
No. 60,134. Patented Dec. 4, 1866.
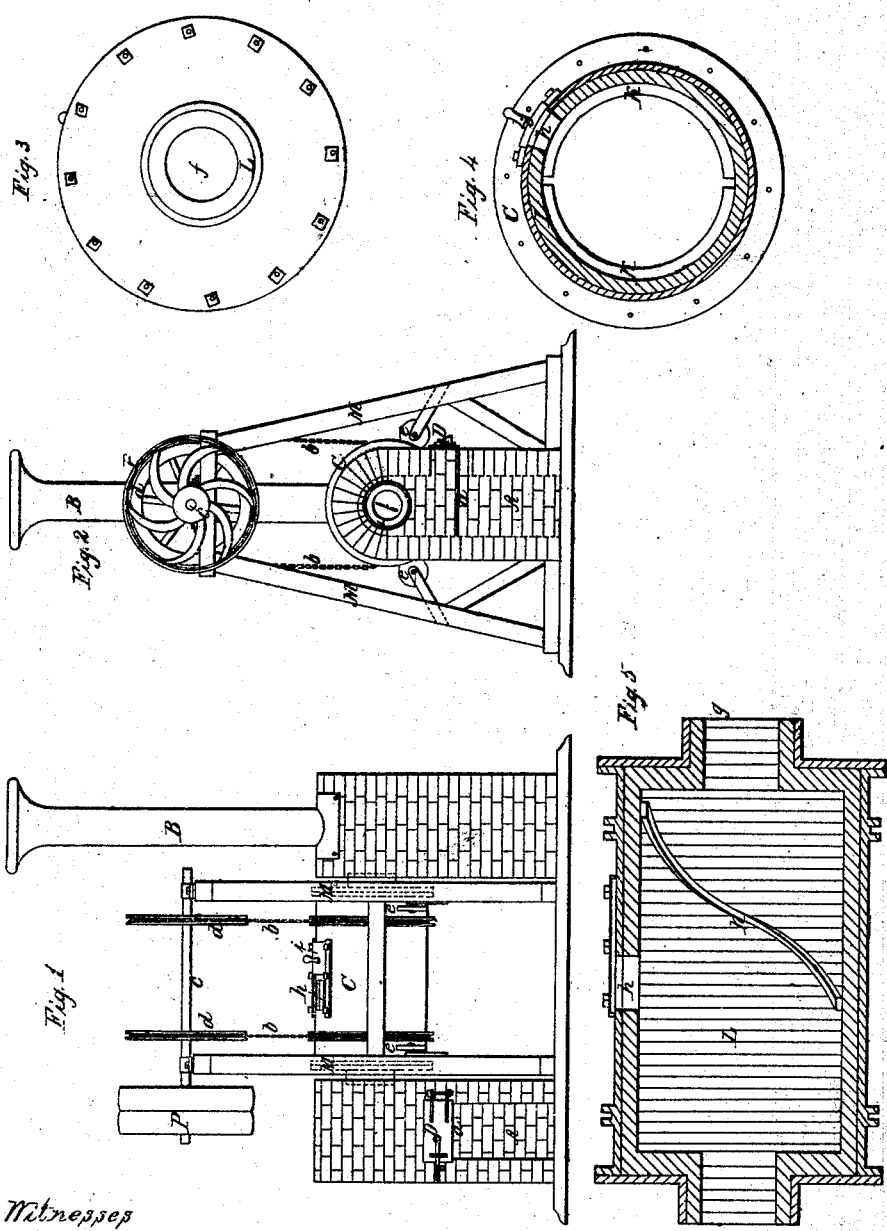

United States Patent Office.

IMPROVED FURNACE FOR DESULPHURIZING ORES.

WILLIAM BRUCKNER, OF SAN FRANCISCO, CALIFORNIA.

Letters Patent No. 60,134, dated December 4, 1866.

SPECIFICATION.

TO ALL TO WHOM THESE PRESENTS SHALL COME:

Be it known that I, WILLIAM BRÜCKNER, of the city and county of San Francisco, State of California, have invented a new and improved Furnace for Roasting Ores; and I do hereby declare that the within is a full and exact description of the construction and operation of the same, reference being had to the drawings, with letters marked thereon, in which—

Figure 1 is a side elevation.
Figure 2 is a sectional end view of the furnace, showing the opening and grate.
Figure 3 is an enlarged end view of the cylinder.
Figure 4 is a sectional end view.
Figure 5 is a sectional side view, showing the lining of brick.

The same letters indicate like parts in all the figures.

I am well aware that furnaces for roasting sulphuretted ores have been erected with great care and at large expense, some of them embodying principles of a highly scientific character, but none, I believe, combining cheapness and simplicity in construction with utility and efficiency of operation to that extent which characterizes my invention. The reduction of sulphuretted ores by the roasting process has been and now is considered one of the most difficult tasks which the metallurgist has to encounter, not only to prevent the precious metals from passing away with the fumes and smoke of the sulphur, arsenic, antimony, and other substances which adhere so closely, and so obstinately refuse, by reason of their intimate connection with the metals, to yield to treatment for their separation, but the difficulty which there is in arranging the furnace so that the charge of ore to be roasted shall more frequently present a new surface to the oxidizing influence of the heat and atmosphere, and the heat be more evenly diffused throughout the whole mass of the ore which is to be submitted to the roasting process. These are some of the obstacles which are to be overcome; and it is confidently believed that, by the proper use of my furnace, these difficulties have in a great measure been overcome.

From careful and correct experiments made in roasting five tons of ore with four reverberatory furnaces, at Virginia City, Nevada, the following results have been deduced:

ROASTING FIVE TONS OF ORE IN TWENTY-FOUR HOURS IN FOUR REVERBERATORY FURNACES:

| | | |
|---|---|---|
| For 12 men, $3 50 | $42 00 | |
| For 3½ cords of wood, $12 | 42 00 | |
| For 500 lbs. salt | 25 00 | |
| Total | $109 00—Cost per ton | $21 80 |

ROASTING FIVE TONS OF ORE IN TWELVE HOURS IN TWO OF BRÜCKNER'S FURNACES, WITH ONE MAN, COSTS AS FOLLOWS:

| | | |
|---|---|---|
| For 1 man | $3 50 | |
| For 2 cords wood | 24 00 | |
| For 500 lbs. salt | 25 00 | |
| Moving power, 7 per cent. of a 30-horse power engine | 3 50 | |
| Total | $56 00—Cost of roasting, per ton | 11 20 |
| Showing a saving, per ton, with Brückner's furnace | | $10 60 |

The nature of my invention consists in providing a horizontal cylinder with screws, or rifles, placed upon the inside, which alternately serve to drive the ore from one end to the other, and evenly presenting the mass of ore to the heat and atmosphere, the whole being revolved by means of chains and pulleys.

To enable others skilled in the art to make and use my invention, I will proceed to describe its construction and operation.

I construct my cylinder of iron or other material, with flanges and head plates strongly bolted together at each end, of the desired dimensions—say for roasting one-half ton of ore, eight feet long, and three feet inside diameter, after the fire-brick lining is introduced. I place in or construct with the brick lining, two screws or rifles, made of fire-brick or iron, and placed diagonally and at opposite ends and sides; by this arrangement the ore is constantly driven from one end to the other of the cylinder, and a new surface is presented to the action of the heat and atmosphere. The position of the screws is such, that they assist in discharging the ore after it is roasted, which is accomplished by opening the discharge door, and after a few revolutions of the cylinder, it is entirely discharged. The fire-place and discharge-chimney are built of brick or stone, with funnels sufficiently large, so that each end of the cylinder may easily fit and revolve. I place a pipe over the discharge-chimney, of any height desired, upon which a condenser may be used, for the purpose of condensing the smoke and fumes if necessary. Upon a framework of wood, over the cylinder, I place a horizontal shaft, with chain pulley, and endless chains passing around the cylinder in raised grooves. I also place rollers attached to each of the four posts of the frame, upon which the cylinder revolves, near its lower periphery, and which serve to steady it as well as to assist in rotating, also that it may not bear too heavily upon the furnace heads and chains. The ore and salt are introduced into the cylinder by means of a sliding door, after which the door is closed, and the fire placed in the furnace. For fuel, I use wood and coal. The cylinder is to be revolved by steam or man power—one man can easily turn it—at the rate of from twenty to thirty revolutions per hour. About four hours are consumed in roasting one charge in my furnace, although different classes of ore need a different space of time for their treatment.

In the accompanying drawings, A represents the furnace; $a$ is the grate; B is a funnel through which the fumes and smoke may pass off; C is the cylinder, suspended by endless chains, $b\ b$, from the chain pulleys $d\ d$, on the shaft $c$; $e\ e$ are rollers placed upon each side of the cylinder, for the purpose of steadying it, and also to assist in rotating; $h$ is a charge and discharge hole to the cylinder, which is closed by the sliding door $i$; $l$ is a small hole made about the fire-place in front of the heat-pipe $f$, (shown at figs. 2 and 3;) $g$ is the opposite pipe, through which the smoke and fumes (shown at fig. 5;) K K K are screws or rifles for the purpose of driving the mass of ore from one end of the cylinder to the other, (shown at figs. 4 and 5.) The screws or rifles, K K, in the cylinder C, are made spiral in opposite directions, to convey the charge alternately in each direction, and heat it uniformly. L L represent the brick lining, (also shown at figs. 4 and 5;) M M are the wood framework; P is a pulley, (shown at fig. 1.)

Having thus described my invention, I do not claim, broadly, a revolving furnace or cylinder, with shelves placed horizontally across its inner surface, for the purpose of roasting ores, for this device is known; but what I claim as my invention and improvement in rotating cylinders for roasting ores is—

The internal screw ribs or rifles, arranged spirally in opposite directions, so as to convey the ore alternately from end to end of the cylinder, and heat it uniformly.

WILLIAM BRUCKNER,

Witnesses:
   J. C. HUTCHINSON,
   C. W. M. SMITH.